Dec. 2, 1941.  H. LOEFFLER  2,264,477
SPOTLIGHT DEVICE
Filed June 12, 1939  2 Sheets-Sheet 2
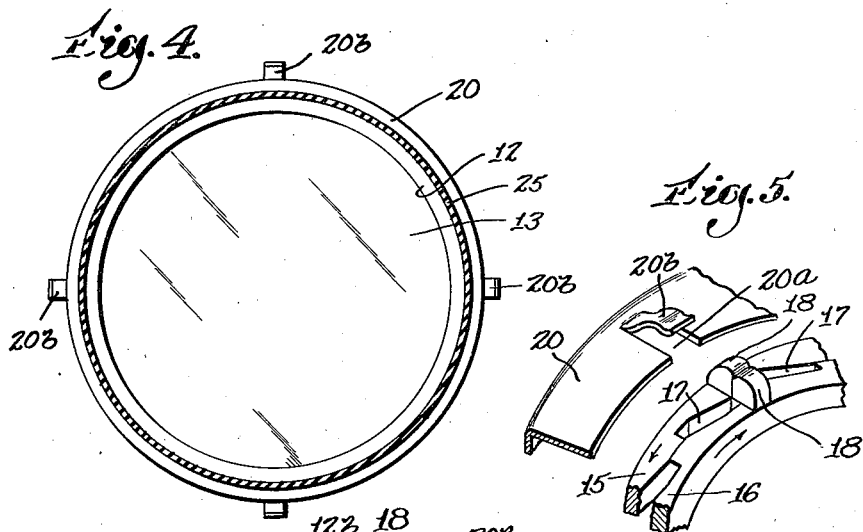
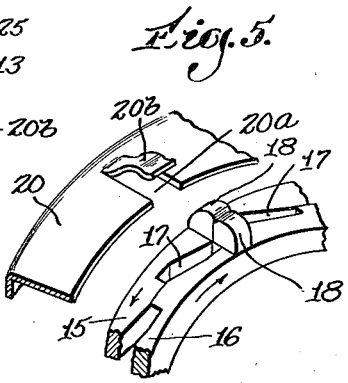
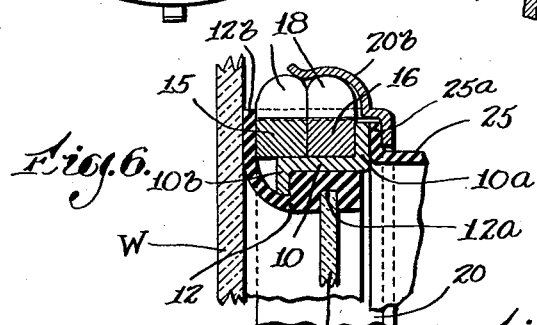
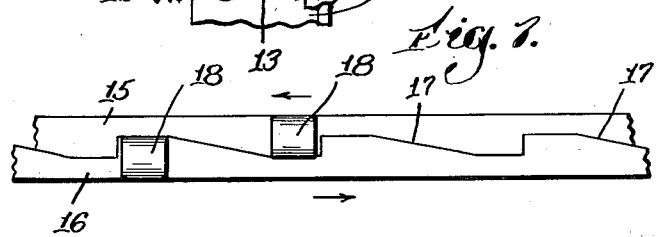
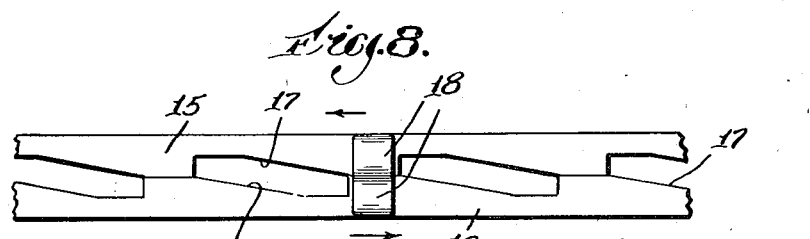
Inventor
Hans Loeffler
by Harold E. Cole
Attorney Patented Dec. 2, 1941

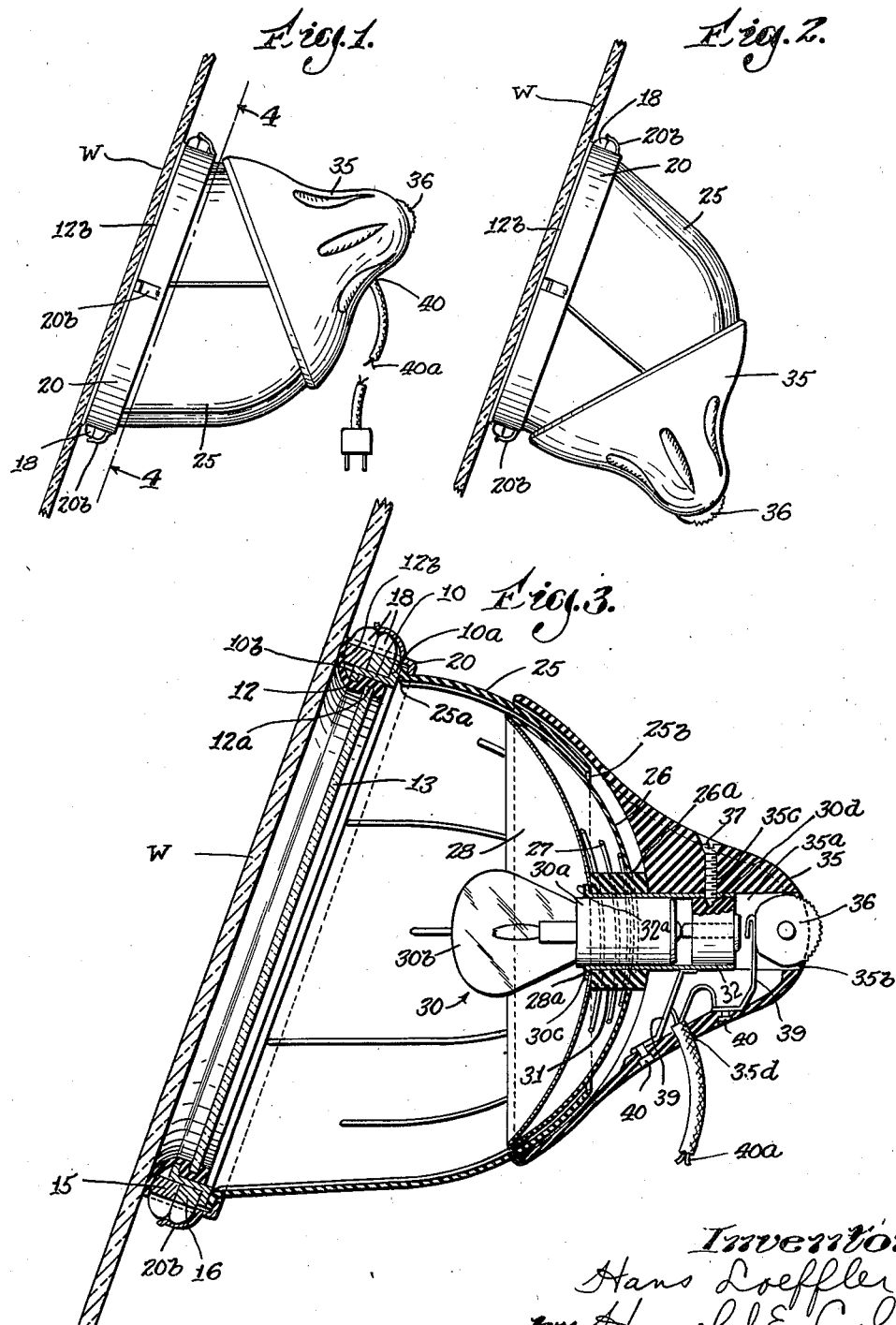

2,264,477

UNITED STATES PATENT OFFICE 2,264,477

SPOTLIGHT DEVICE

Hans Loeffler, Brookline, Mass.

Application June 12, 1939, Serial No. 278,609

2 Claims. (Cl. 248—206)

This invention relates to a spotlight and a supporting attachment therefor.

One object of my invention is to provide a spotlight at relatively low cost that can readily be connected or disconnected from attaching means that supports it; but which will remain indefinitely in association with said attaching means if so desired. Another object is to provide means to insure a locking connection between the spotlight and attaching means so that while swiveling the spotlight to direct the rays of light wherever desired the attaching means will not be unintentionally loosened or dislodged from its position on an automobile windshield or other object supporting it. Another object is to provide improved means to increase or decrease the suction grip of said attaching means on a windshield or the like by a simple, even, rotative movement. A further object is to improve the assembly construction of said spotlight so that the moving parts will not slip out of place, and will always be correctly positioned and respond to any directed movement in a predetermined manner.

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

In the drawings:

Figure 1 is a side elevational view of my spotlight in association with attaching means suctionally held to the windshield of an automobile or the like, and Figure 2 is the same view but showing the handle control member and housing of my spotlight in different positions from those shown in Figure 1.

Figure 3 is a longitudinal sectional view of my spotlight in association with attaching means suctionally held to a said windshield.

Figure 4 is a sectional view taken on the line 4—4 of Figure 1.

Figure 5 is a perspective view of the pair of clamping rings that hold said attaching means to a windshield or other object and showing a separate connecting rim that removably joins my spotlight to said attaching means, these parts being shown broken away.

Figure 6 is an enlarged, sectional view, partly broken away, showing the outer edge of my spotlight in association with said attaching means.

Figure 7 is a plan view of said pair of clamping rings in association with each other and as close together as they can be moved, in which position said attaching means can readily be removed from said windshield. Figure 8 is a similar plan view; but showing said clamping rings in expanded position as far apart as they can be moved while in association with each other, in which position the maximum suction is provided to hold said attaching means to the windshield.

As illustrated, my spotlight is attached to an object by means which consist of a round metal ring 10, preferably made of aluminum, which has protruding lips 10a and 10b at opposite ends. A rubber skirt 12, having a channel 12a formed therein, has a portion bearing against said metal ring 10 as shown in Figure 3 of the drawings, and another extension portion 12b that extends outside, and is adapted to be pressed against a windshield W or any other object that my attaching means is to be mounted on by a suction hold. The outer edge of a glass plate 13 fits in said rubber skirt groove 12a which makes said attaching means air tight. Two clamping rings 15 and 16, which are alike, being structural duplicates, serve to control the attachment of said attaching means to the windshield W. Each of said clamping rings 15 and 16 has the same cam surfaces 17, and as the rings are slid along said cam surfaces 17 they may be spread apart or moved together as desired. Each said ring has four locking lugs 18 that project from the periphery thereof outwardly. It is preferable to have four said cam surfaces 17 between each said locking lug 18, making sixteen altogether. When said locking lugs 18 are opposite each other the said clamping rings 15 and 16 contact at their highest portions, being expanded relative to each other the maximum distance, and my attaching means thereby is fixedly held to the windshield by suction. As said clamping rings are moved closer together, as illustrated in Figure 7 of the drawings, the suction hold is weakened, as the space between said windshield W and said glass plate 13 is less.

A separate connecting rim 20 is provided which fits over a housing or casing 25 later described, and projects beyond to extend over part of the attaching means. Formed in its outer periphery are four locking recesses 20a which cooperate with said locking lugs 18 so that when said clamping rings 15 and 16 are in their expanded position, as illustrated in Figure 5, said locking lugs 18 extend into said recesses 20a and bear against the adjoining portions of said connecting rim 20, and any rotative movement of said rings 15 and 16 is prevented while they are so positioned in said recesses 20a, and, therefore, the said clamping rings 15 and 16 cannot be loosened or moved relative to each other. Without a locking arrangement to hold my suction holding means in a predetermined position one of said clamping rings 15 and 16 would often be unintentionally moved as when rotating said housing 25, thereby moving them closer together and diminishing the suction hold of the attaching means to the windshield or releasing it altogether. Said connecting rim 20 has four spring fingers 20b above said recesses 20a which project beyond and extend over said locking lugs 18 when they are together. Said fingers 20b preferably are formed from the metal that is struck out of said rim 20 in making said recesses 20a.

A housing or casing 25 has a flange 25a at its front end and a substantial opening 25b at the rear that is off center. It is freely rotatable in both directions. The shape is preferably that shown in the drawings.

Within and next to the inner surface of said housing 25 is a sliding plate 26 having an opening 26a at the rear through which the socket 30a of a lamp 30, later described, passes. Bearing against the inner surface of said sliding plate 26 is a coil spring 27 which also bears against the back surface of a reflector plate 28 that has an opening 28a at its rear. Within said housing 25 is a lamp 30 having a socket 30a and a bulb 30b, said socket 30a extending through said openings 25b and 26a. At its rear said socket 30a has a screw-threaded hole 30d. Extending around a socket holder 32, later described, is a rubber collar 31 which aids in holding said socket in position and also serves as a stop to limit the angle to which a control handle 35, later described, can be swivelly moved. A tubular socket holder 32 in said control member 35 firmly holds said socket 30a in position. This holder 32 has a flange 32a which bears against said reflector plate 26 and helps hold it in position.

Extending over a portion of said casing 25 is a handle or control member 35 which is capable of swivel movement, and which has a constricted portion 35a at the rear with an opening therein to receive said socket 30a, and has a slot 35b at its rear end into which a switch button or toggle 36 movably extends. There is a screw hole 35c in said control member 35 through which a screw 37 passes and screw-threadedly connects in said socket hole 30d, and there is also another hole 35d therein. Within said control member 35 are contact springs 39 one of which is always in contact with said socket housing 32 and the other normally spaced therefrom, as shown in Figure 3 of the drawings, and which are held by screws 40 which extend through said holes 35d in said control member 35. Two wires 40a extend through said hole 35d and connect with said contact springs 39 in the usual manner. When said switch button 36 is turned to "on" position it contacts with one of said contact springs 39, establishing an electrical circuit through said wires 40 to an outside source of current, not shown.

Said handle control member 35 can be moved universally to an angle of approximately 60 degrees which turns said lamp 30 and said reflector plate 28, while said housing 25 can be rotated as desired to thereby direct the rays of light through the windshield W at an increased angle, it being of an uneven shape, as shown, so that altogether an angle of movement of 120 degrees is possible with my device.

Said coil spring 27 presses against both said inner sliding plate 26 and said reflector plate 28, holding them in fixed association, and thereby overcoming any tendency towards involuntary movement of said inner plate or said reflector plate.

In using my device the attaching means is mounted to the windshield W of an automobile or other object by pressing the rubber skirt 12 against the windshield W, and then rotatively turning one of said clamping rings until they are expanded, as shown in Figure 8 of the drawings, the maximum distance, thereby creating the maximum suction or vacuum. Said suction holding means may be left on said windshield or object indefinitely, and the lighting device itself removed therefrom by withdrawing said locking rim 20 therefrom by merely overcoming the spring tension of said four fingers 20b on said locking rings 15 and 16 in which event the light may be used wherever desired, such as a trouble lamp.

In moving said handle control member 35, when said collar 31 reaches a point where it contacts said housing 25, the limit of the swivelling movement has been reached, said collar then serving as a stop member.

What I claim is:

1. A suction cup attaching unit adapted to support an article to be held, embodying two ring members having co-operative cam surfaces extending to the same height on each thereof, adapted to separate said rings upon relative turning thereof, one of said rings having fixedly assembled therewith an intermediate angular member providing a seat, a skirt fitted in said seat extending transversely inward beyond the outer ring member to engage closely a smooth surface to which the device is to be applied, and a closure plate also borne by said angular member to complete the suction cup, whereby upon relative turning of said ring members with respect to each other, said plate is spaced farther from the surface to which said skirt is applied to cause said unit to adhere strongly by suction to the surface to which it is applied.

2. A suction cup attaching unit adapted to support an article to be held, embodying two ring members having co-operative cam surfaces extending to the same height on each thereof adapted to separate said rings upon relative turning of said rings, one of said rings having fixedly assembled therewith a skirt extending transversely inward beyond the other ring member to engage closely a smooth surface to which the device is to be applied, a closure plate also borne by the ring member to which the skirt is fixed to complete the suction cup, whereby upon relative turning of said ring members with respect to each other, said plate is spaced farther from the surface to which said skirt is applied to cause said unit to adhere strongly by suction to the surface to which it is applied, and lugs extending from each of said ring members co-operative with like lugs on the other ring member to serve as finger pieces for turning said ring members with respect to each other, lugs on the two ring members being in alinement when the ring members are separated a maximum distance, said lugs adapted to still further serve as part of a bayonet connection for holding an article to be held, assembled onto said ring members.

HANS LOEFFLER.

CERTIFICATE OF CORRECTION.

Patent No. 2,264,477.　　　　　　　　　　　　　　December 2, 1941.

HANS LOEFFLER.

It is hereby certified that error appears in the printed specification of the above numbered patent requiring correction as follows: Page 2, second column, line 35, claim 1, for "outer" read --other--; and that the said Letters Patent should be read with this correction therein that the same may conform to the record of the case in the Patent Office.

Signed and sealed this 27th day of January, A. D. 1942.

(Seal)　　　　　　　　　　　　　　　　　　　　　Henry Van Arsdale,
　　　　　　　　　　　　　　　　　　　　　Acting Commissioner of Patents.